United States Patent
Smith

(10) Patent No.: US 11,228,210 B2
(45) Date of Patent: Jan. 18, 2022

(54) MULTI-COIL WIRELESS POWER TRANSMITTER

(71) Applicant: Renesas Electronics America Inc., Milpitas, CA (US)

(72) Inventor: Nicholaus Smith, La Mesa, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/810,737

(22) Filed: Mar. 5, 2020

(65) Prior Publication Data
US 2021/0281118 A1 Sep. 9, 2021

(51) Int. Cl.
*H02J 50/40* (2016.01)
*H02J 50/10* (2016.01)
*H02J 50/80* (2016.01)
*H02J 50/90* (2016.01)
*H02J 7/00* (2006.01)

(52) U.S. Cl.
CPC ........ *H02J 50/402* (2020.01); *H02J 7/00034* (2020.01); *H02J 50/10* (2016.02); *H02J 50/80* (2016.02); *H02J 50/90* (2016.02)

(58) Field of Classification Search
CPC .... H02J 5/005; H02J 7/00032; H02J 7/00034; H02J 7/025; H02J 50/10; H02J 50/12; H02J 50/40; H02J 50/402; H02J 50/80; H02J 50/90
USPC ........................................................ 307/104
See application file for complete search history.

(56) References Cited

U.S. PATENT DOCUMENTS

| | | | | |
|---|---|---|---|---|
| 7,262,700 | B2* | 8/2007 | Hsu ...................... | H02J 7/0042 340/572.1 |
| 10,892,648 | B2* | 1/2021 | Lee ........... | H02J 7/042 |
| 2010/0187912 | A1* | 7/2010 | Kitamura ................ | H02J 50/12 307/104 |
| 2012/0007437 | A1* | 1/2012 | Fells .................... | H04B 5/0037 307/104 |
| 2014/0203662 | A1* | 7/2014 | Bae ........................ | H02J 50/12 307/104 |
| 2014/0340031 | A1* | 11/2014 | Mi ........................ | H02J 50/005 320/108 |
| 2016/0064988 | A1* | 3/2016 | Ku ........................ | B60L 53/122 320/108 |
| 2016/0190855 | A1* | 6/2016 | Katabi .................... | H02J 50/12 320/108 |
| 2016/0233724 | A1* | 8/2016 | Bae ........................ | H02J 50/50 |
| 2018/0097403 | A1* | 4/2018 | Jung ....................... | H02J 50/80 |
| 2018/0226815 | A1* | 8/2018 | Yamanishi .............. | H02J 7/025 |
| 2019/0190324 | A1* | 6/2019 | Bossetti ................... | G01D 5/24 |

(Continued)

*Primary Examiner* — Levi Gannon
(74) *Attorney, Agent, or Firm* — Haynes and Boone, LLP

(57) ABSTRACT

A system and method of transmitting power according to some embodiments includes sequentially pinging each of a plurality of transmit coils to locate a receiver; determining one or more active coils from the plurality of transmit coils based on the location of the receiver; activating the one or more active coils in a full-bridge mode to transfer power to the receiver; determining a base efficiency based on the one or more active coils; monitoring non-active ones of the plurality of transmit coils; determining if the receiver has moved based on the monitoring; if the receiver has moved to a new position, determining secondary coils according to the new position, and transitioning power to provide power from a new active coil configuration.

20 Claims, 5 Drawing Sheets

(56) References Cited

U.S. PATENT DOCUMENTS

2020/0076242 A1\* 3/2020 Narayana Bhat ....... H02J 50/90
2020/0143983 A1\* 5/2020 Wang .................... H02J 50/005

\* cited by examiner

MULTI-COIL WIRELESS POWER TRANSMITTER

TECHNICAL FIELD

Embodiments of the present invention are related to wireless transmission of power and, in particular, to operating a multi-coil wireless power transmitter in the presence of a wireless power receiver.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There are multiple different standards currently in use for the wireless transfer of power. The most common standard for wireless transmission of power is the Wireless Power Consortium standard, the Qi Standard. Under the Wireless Power Consortium, the Qi specification, a magnetic induction coupling system is utilized to charge a single device that is coupled through the receiver coil circuit. In the Qi standard, the receiving device coil is placed in close proximity with the transmission coil while alternate or amended standards may allow the receiving device coil to be placed near the transmitting coil, potentially along with other receiving coils that belong to other charging devices.

Typically, a wireless power system includes a transmitter coil that is driven to produce a time-varying magnetic field and a receiver coil, which can be part of a device such as a cell phone, PDA, computer, or other device, that is positioned relative to the transmitter coil to receive the power transmitted in the time-varying magnetic field.

Some wireless power transmitters include multiple transmission coils that can be arranged in an area to create larger charging areas. As a receiver is brought close to the transmitter, specific transmit coils may sense and detect the proximity of the receiver as being closer or further and selection of the transmitter coils can be activated and chosen by programming. However, if the receiver is moved during the wireless power transmission, the wireless power transmitter will lose efficiency.

Therefore, there is a need to develop improved ways to sense and select the wireless power transmitters to activate.

SUMMARY

According to some embodiments, a wireless power transmitter with a plurality of transmit coils that efficiently provides power to a receiver according to the position of the receiver over the plurality of transmit coils. According to some embodiments, a wireless power transmitter includes a plurality of coils; a switching network coupled to the plurality of coils, the switching network receiving one or more power signals and applying the one or more power signals to one or more of the plurality of coils according to switching signals; a power source configured to provide the one or more power signals to the switching network according to power control signals; a signal sensor configured to receive signals from each of the plurality of coils and provide sense signals; and a controller configured to provide switching signals to the switching network, power control signals to the power source, and to receive sense signals from the signal sensors. The controller is configured to execute instructions to determine a position of a receiver relative to the plurality of coils based on the sense signals, select one or more of the plurality of coils as active coils based on the position, provide power control signals to the power source, provide switching signals to the switching network to provide power from the one or more power signals to the active coils, monitor the sense signals to determine whether the receiver has moved to a new position. If the receiver has moved to a new position, reassign active coils according to the new position and transition power in the switching network to provide power from the reassigned active coils.

A method of transmitting power according to some embodiments includes sequentially pinging each of a plurality of transmit coils to locate a receiver; determining one or more active coils from the plurality of transmit coils based on the location of the receiver; activating the one or more active coils in a full-bridge mode to transfer power to the receiver; determining a base efficiency based on the one or more active coils; monitoring non-active ones of the plurality of transmit coils; determining if the receiver has moved based on the monitoring; if the receiver has moved to a new position, determining secondary coils according to the new position, and transitioning power to provide power from a new active coil configuration.

These and other embodiments are discussed below with respect to the following figures.

These figures are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
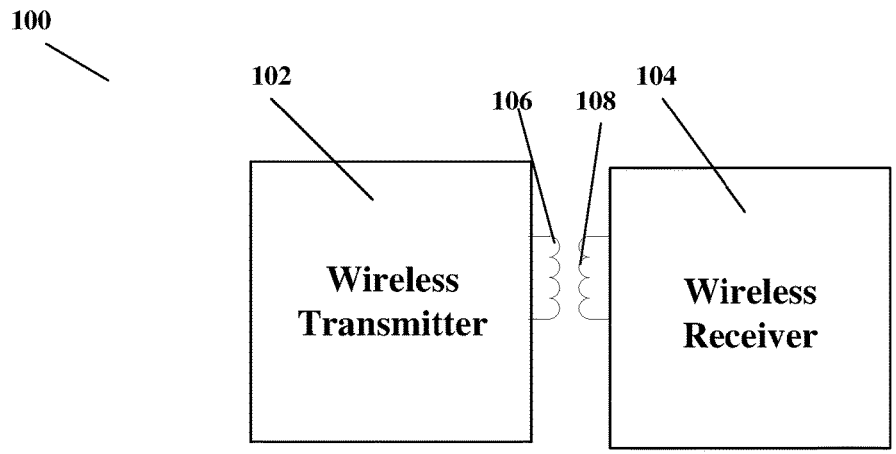
FIG. 1 illustrates a wireless power transmission system.

FIG. 1 illustrates an example wireless power transmission system 100. As illustrated in FIG. 1, a wireless transmitter 102 is coupled to a coil 106 and a wireless receiver 104 is coupled to a coil 108. Coil 106 is driven by wireless transmitter 102 to produce a time varying magnetic field that in turn induces a current in coil 108. Coil 108 is coupled to wireless receiver 104, which can receive the power transmitted through the time varying magnetic field from wireless device 102.

Wireless receiver 104 can be any device with wireless power functions. Many phones, laptops, tablets, and other devices include a wireless power function. In many cases, these devices can both receive and transmit wireless power. In some examples, wireless transmitter 102 may be a stationary wireless power charger.

Embodiments of the present invention include a wireless power transmitter with a plurality of transmission coils. The transmission coils are spatially separated to cover an area, over which a wireless power receiver can be placed. Such devices include, for example, wireless power transmission pads or other such devices that include an array of spatially separated transmission coils.

In general, the receiver connects with one of the transmission coils for transmission of wireless power. With multi-coil designs, there is an issue that when the receiver connects to a transmission coil and, during the transmission of power, is moved to be proximate another one of the transmission coils or moved to be placed between two of the transmission coils, the efficiency of wireless power becomes low due to distance. In some cases, eventually the receiver will disconnect from the active coil and reconnect to the next coil, which is closer. However, the transition is often inefficient. Another consequence of these arrangement is that the initial connection to the active transmission coil may take longer due to a need to find the optimal coil by pinging and checking the signal strength packet for each of the transmission coils prior to transferring between a first transmission coil and a second transmission coil. A third impact is the presence of dark-zones between transmission coils. Dark-zones refer to areas where the receiver has difficulty connecting between coils and low active areas near cross-over points between transmission coils.

Figure 2A:
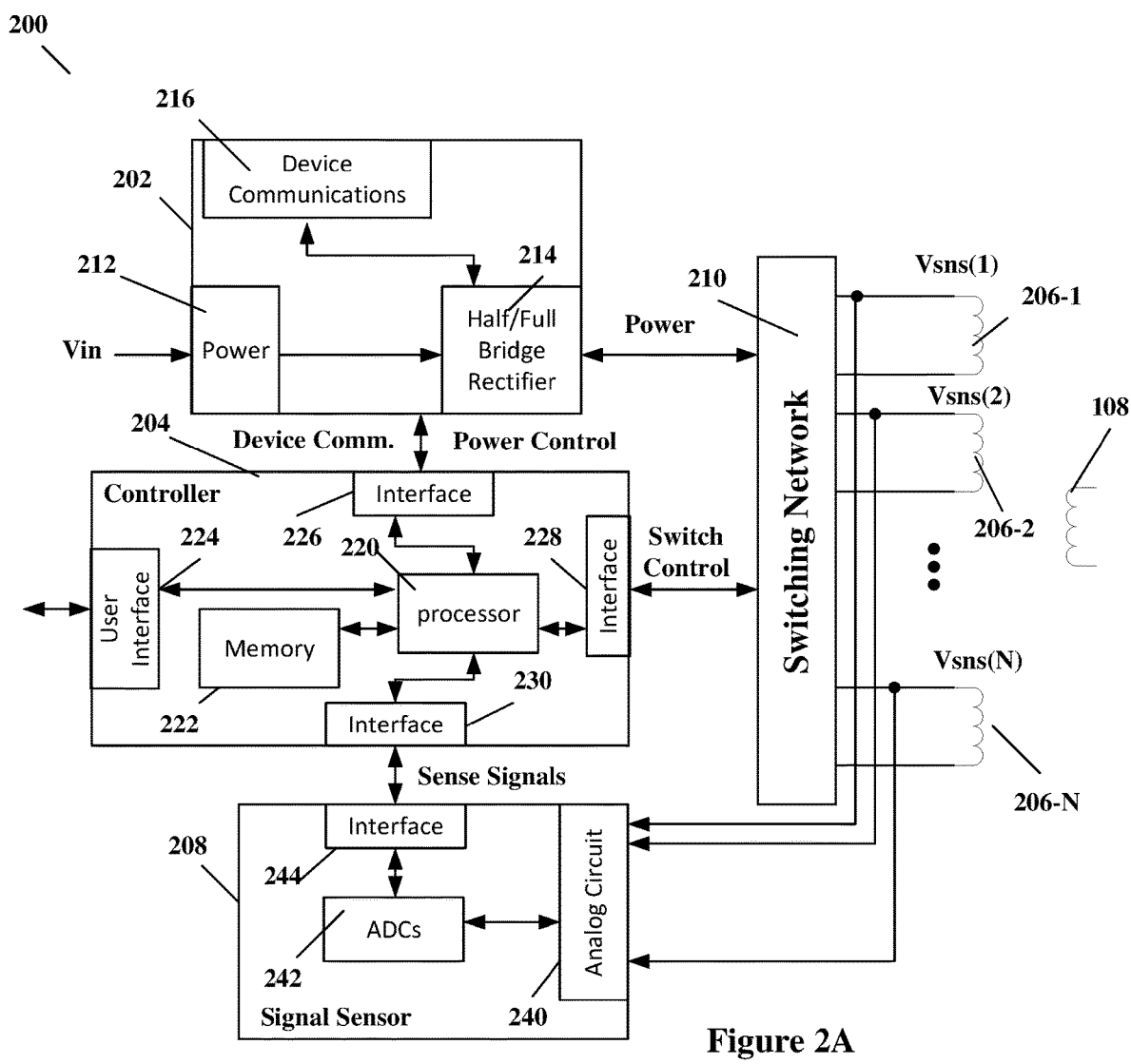
FIGS. 2A and 2B illustrate a multi-coil wireless transmitter according to some embodiments of the present invention.

FIG. 2A illustrates a multi-coil transmitter 200 according to some embodiments of the present invention. As is illustrated in FIG. 2A, an array of transmitter coils 206-1 through 206-N are coupled to a switching network 210. Switching network 210 is coupled to receive power to drive selected ones of transmitter coils 206-1 through 206-N according to received switching control signals. Switching network 210 can direct power to one or multiple ones of coils 206-1 through 206-N according to the switching control signals. In some embodiments, nearest-neighbor coils 206-1 through 206-N can be arranged to produce magnetic fields in opposite directions, for example by arranging that the current flows in opposite directions through the coils or by winding the coils in opposite directions, which may also increase the efficiency of wireless power transfer.

As is illustrated in FIG. 2A, power is provided by a power source 202. Power source 202 includes a power converter 212, which receives an input voltage Vin and provides a voltage to rectifier or inverter 214. In accordance with embodiments of the present invention, rectifier or inverter 214 can be operated in half-bridge mode or full-bridge mode to provide one or two power signals to switching network 210 powering one or more transmitter coils simultaneously as needed to maximize efficiency. The input voltage Vin to power converter 212 can be from any power source, for example 110 VAC or a DC voltage, which is sufficient to drive the wireless power transmitter 200.

As is further illustrated in FIG. 2A, power source 202 can further include device communications 216 that can communicate with a receiver device by modulating or demodulating the power signals. In some systems, device communications 216 can transmit data to a receiver device by modulating the frequency of the power signals while the corresponding receiver device can transmit data by modulating a load on the received wireless power signal.

Switching network 210 and power converter 212 are coupled to a controller 204. Controller 204 provides control signals that determine the output power levels and frequency of the power signals from power source 202 to switching network 210, switches rectifier 214 between full-bridge operation and half-bridge operation and determines which of coils 206-1 through 206-N are coupled to receive power signals from power source 202. The same circuits used to demodulate the communication signals can also detect the magnetic field strength by sensing the incoming induced voltage and thus can be used to determine position.

Controller 204 can be any circuit or set of circuits capable of carrying out the processes discussed in this disclosure. As such, in some embodiments controller 204 can include a processor 220 coupled to a memory 222. Processor 220 can be any processor, for example a microcomputer, microcontroller, microprocessor, or other processing circuit. Memory 222 can include a combination of volatile and non-volatile memory such that processor 220 can execute instructions stored in memory 222 and store and retrieve data in memory 222. Processor 220 is further coupled to an interface 228 that allows processor 220 to communicate with switching network 210. Processor 220 is further coupled to an interface 226 that allows processor 220 to communicate with power converter 202. Processor 220 is further coupled to an interface 230 that allows processor 220 to communicate with a signal sensor 208. Further, a user interface 224 may be coupled to processor 220. User interface 224 may provide communications with a user of transmitter 200, including direct connection to user input and display devices as well as wireless communications (e.g., Bluetooth or other wireless standard) to a wireless device brought proximate to transmitter 200.

As illustrated in FIG. 2A, controller 204 is coupled to signal sensor 208 to receive signals from coils 206-1 through 206-N. In particular, a signal Vsns(1) through Vsns(N) from each of coils 206-1 through 206-N can be received into an analog circuit 240. Analog circuit 240 can provide analog filtering and amplification before the signals are digitized in analog-to-digital converter 242. The signals, digitized Vsns (1) through Vsns(N), are read by controller 204 through interface 230 of controller 204 coupled to interface 244 of signal sensor 208. In some embodiments, signal sensor 208 can be used to collect signals from the inactive ones of coils 206-1 through 206-N (i.e., those of coils 206-1 through 206-N that are not switched to receive power by switching network 210). In some cases, signal sensor 208 may be part of a demodulation filter incorporated in device communications 216.

Figure 2B:
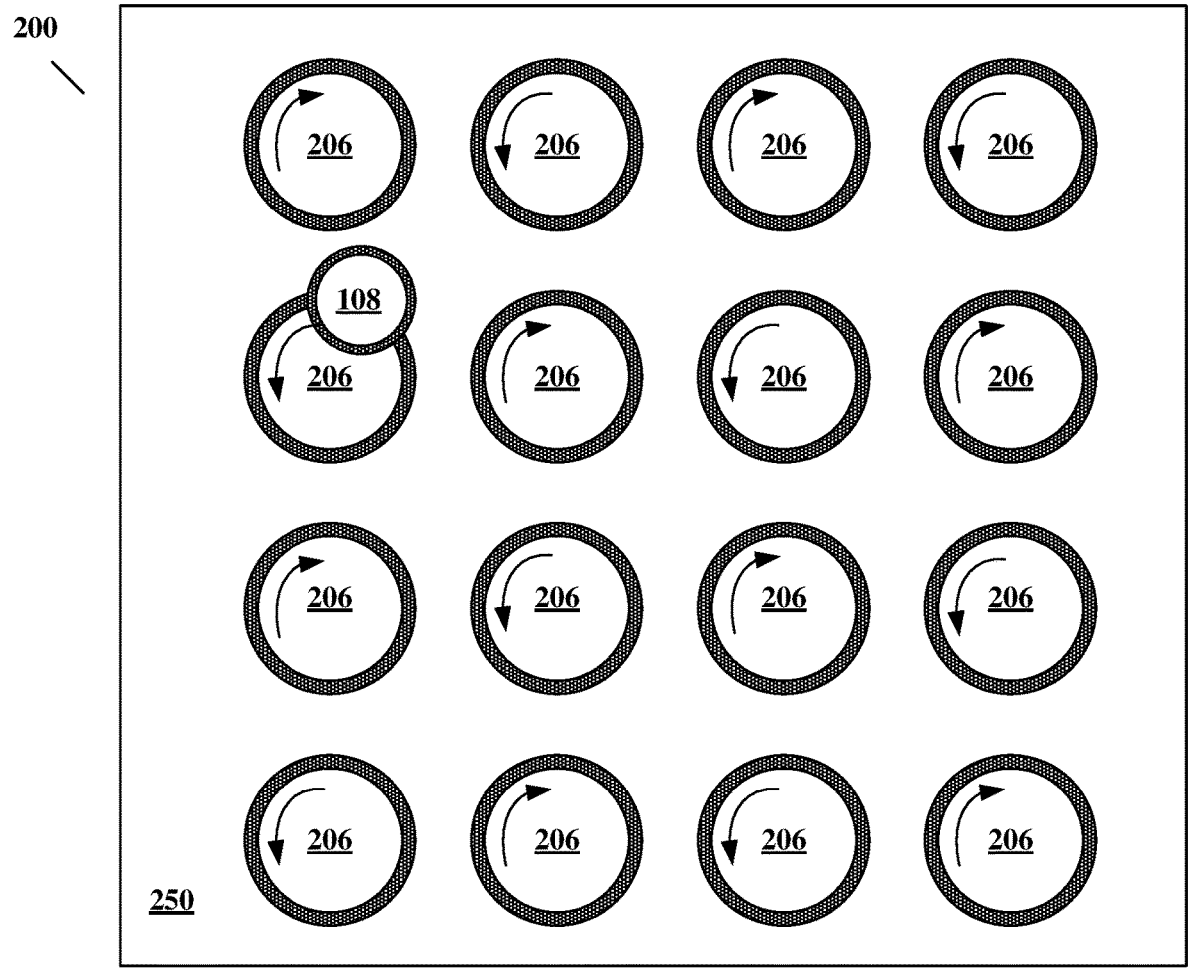

FIG. 2B illustrates a planar view of coils 206-1 through 206-N. As is illustrated in FIG. 2B, coils 206 (collectively 206-1 through 206-N) may be arranged in a pad 250. As is illustrated, nearest-neighbor coils 206 may be arranged to produce fields of opposite direction, either by reversing the currents or by adjacent coils being oppositely wound. As is further illustrated in FIG. 2B, a receiver coil 108 is positioned over pad 250 so that it can be activated by one or more of coils 206.

As is further illustrated in FIGS. 2A and 2B, receive coil 108 of wireless receive device 104 is placed over coils 206-1 through 206-N. Controller 204 receives digitized sense signals Vsns(1) through Vsns(N) and can use the information collected from the inactive coils in signal sensor 208, which as discussed above may be the Vsns detector of the demodulation filter, to sense the voltage picked up by coils that are adjacent to the active coil(s) and to determine where receiver coil 108 is located based on the sensed voltage from the unused coils. When the Vsns voltage is observed to be increasing on an inactive coil, this indicates that receive coil 108 is approaching the unused coil. If this is sensed before connection is moved between coils, the object may be positioned between coils. With this information and by winding the TX coils in opposite directions, or by driving current to flow in opposite directions, the magnetic fields can be made to sum and a cleaner more efficient hand-off between coils may be made. Further, optimal efficiency can be preserved without the system disconnecting and interrupting charging.

Several cases can be presented. In a first case, receiver coil 108 is placed on a first one of coils 206, i.e. an active coil 206-*i*, and then moved to a second one of coils 206, i.e. a second coil 206-*j*, during charging. In general, coils 206-*i* and 206-*j* are adjacent, or nearest-neighbor, coils. As movement is detected by monitoring the sensor voltages Vsns, controller 204 switches the active coil 206-*i* to operate in a half-bridge mode and will activate the adjacent second coil 206-*j* in half-bridge mode. The resulting two magnetic fields will be in phase at receive coil 108 and sum so the receive device keeps constant power. Transmitter 200 then charges using two coils, each operating in half-bridge mode. In some embodiments, controller 204 can receive the receiver power (as reported by wireless receiver 104) in a received power packet (RPP) and the sent power from power converter 202. The RPP is received from wireless power receiver 104 through device communications 216. Controller 204 can then determine the efficiency (received power/DC input power) and, if the efficiency is less than the previous mode (original active coil 206-*i* operating in full-bridge mode), controller 204 can then switch to full-bridge mode on the second coil (coil 206-*j*), converting the second coil to the active coil, and again check efficiency. If the efficiency is still lower, then the controller 204 will hand-off back through the two coils each operating in half bridge and back to the original active coil (coil 206-*i*) operating in full-bridge mode. If any efficiency check shows improvement, the indicated active coil will be used, otherwise the highest efficiency configuration of coils can be used.

In a second case, controller 204 determines from the signal strengths Vsns(1) through Vsns(N) that receive coil 108 is in the middle between the active coil and a neighbor coil. In that case, controller 204 can activate both coils, each in half-bridge mode or both in full-bridge mode, to charge and optimal efficiency is found and used.

In a third case, receive coil 108 is located in a normally void zone too far for either coil to reach alone. In that case, two coils can be activated in full-bridge mode to increase the magnetic field and reach receive coil 108 to allow a larger effective active area.

As discussed above, one or more of coils 206-1 through 206-N may be operated in full-bridge (FB) mode, half-bridge (HB) mode, or as sensing only mode. Any combination of operating modes can be used to optimize efficiency and prevent disconnects in areas between transmission coils 206. Embodiments of the present invention simultaneous switch multiple coils at the same time in response to monitored coil signals Vsns(1) through Vsns(N), for example using the demodulation signal from device communications, from each coil to sense picked up voltage from each coil in the system. Embodiments of the present invention can apply to any system with more than one transmit coil.

Figure 3A:
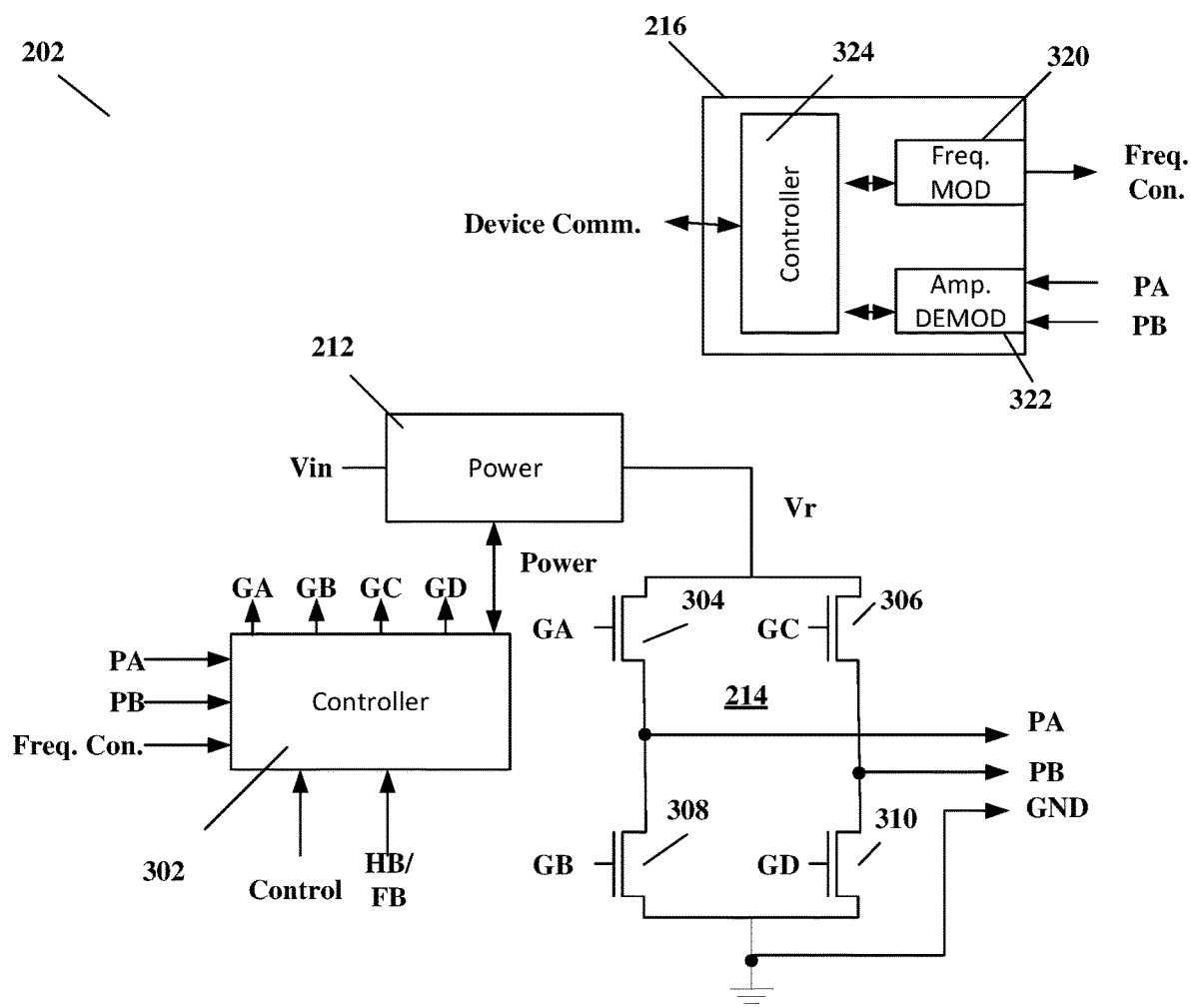
FIGS. 3A and 3B illustrate further details of the example multi-coil wireless transmitter illustrated in FIGS. 2A and 2B.

FIG. 3A illustrates an example of a power source 202 according to some embodiments of the present invention. As illustrated in FIG. 3A, and in FIG. 2A above, power source 202 includes a power converter 212 coupled to provide power to a rectifier 214 and a device communication block 216. As illustrated in FIG. 3A, power converter 212 receives input voltage Vin and provides a voltage Vr to rectifier 214 according to control signals that is received from controller 204. The control signals can include power level control signals, center frequency control signals, half-bridge/full-bridge signals, and device communications signals. Power source 202 can provide controller 204 with power feedback signals, device communications signals, and other signals.

Rectifier 214 includes transistors 304 and 308 series coupled between the voltage Vr and ground. Similarly, transistors 306 and 310 are also serially coupled between Vr and ground. The node between transistors 304 and 308, PA, provides a first power output signal from rectifier 214 while the node between transistors 306 and 310, PB, provides a second power output from rectifier 214. Transistors 304, 306, 308, and 310 are controlled by gate voltages GA, GC, GB, and GD, respectively. Consequently, rectifier 214 can be operated in full-bridge mode by alternately engaging gate voltages GA, GD with gate voltages GC, GB. The power output is represented between PA and PB. Either transistor pairs with transistors 304 and 308 or transistors 306 and 310 can be operated in half-bridge mode. Transistors 304 and 308 are operated in half-bridge mode by alternately activating transistor 304 and transistor 308, with the output voltage provided between PA and ground (GND). Similarly, transistors 306 and 310 are operated in half-bridge mode by alternately activating transistor 306 and transistor 310, with the output voltage provided between PB and ground (GND). Rectifier 214 can be operated to provide two half-bridge operated rectifiers with outputs at PA to GND and PB to GND.

The gate voltages GA, GB, GC, and GD for transistors 304, 308, 306, and 310, respectively, are provided by a controller 302. Controller 302 can include a processor and memory, both volatile and nonvolatile, sufficient to perform the functions discussed here. In some embodiments, controller 302 may be included with controller 204 as illustrated in FIG. 2A.

As illustrated in FIG. 3A, controller 302 provides the gate voltages in response to control signals from controller 204 and a half-bridge/full-bridge signal HB/FB. The control signals include signals to control frequency and to activate or deactivate transmission of wireless power. Controller 302 generates the gate voltages GA, GB, GC, and GD to driver rectifier 214 in half-bridge mode or in full bridge mode at the frequency determined by the control signals. In some embodiments, controller 302 can adjust the operating frequency to maximize efficiencies by monitoring the voltages PA and PB. Further, controller 302 may adjust the half or full-bridge voltage used to drive the rectifier or inverter and adjust the gate voltages GA, GB, GC, and GD to generate wireless power at a modulated frequency according to the input signal Freq. Con. The Freq. Con. Signal is generated by device communications block 216.

As further illustrated in FIG. 3A, device communications block 216 communicates with controller 204 to exchange data to be transmitted to wireless power receivers, data received from wireless power receivers, and other data. Device communications can include a controller 324. Controller 324 can be any controller device and can itself include a processor and sufficient memory to perform the functions discussed here. In some embodiments, controller 324 can be included in controller 204.

Controller 324 is coupled to a frequency modulation block 320. Frequency modulation block 320 modulates data to be transmitted with the wireless power and that provides frequency control signals Freq. Con. reflecting a frequency modulation. Controller 326 is further coupled to an amplitude demodulation 322 that receives the voltages PA and PB and demodulates an amplitude modulation on those voltages. As discussed above, the amplitude modulation is a result of load modulation at the wireless power receiver. The demodulated digital data transmitted by the wireless receiver is then sent to controller 204.

Figure 3B:
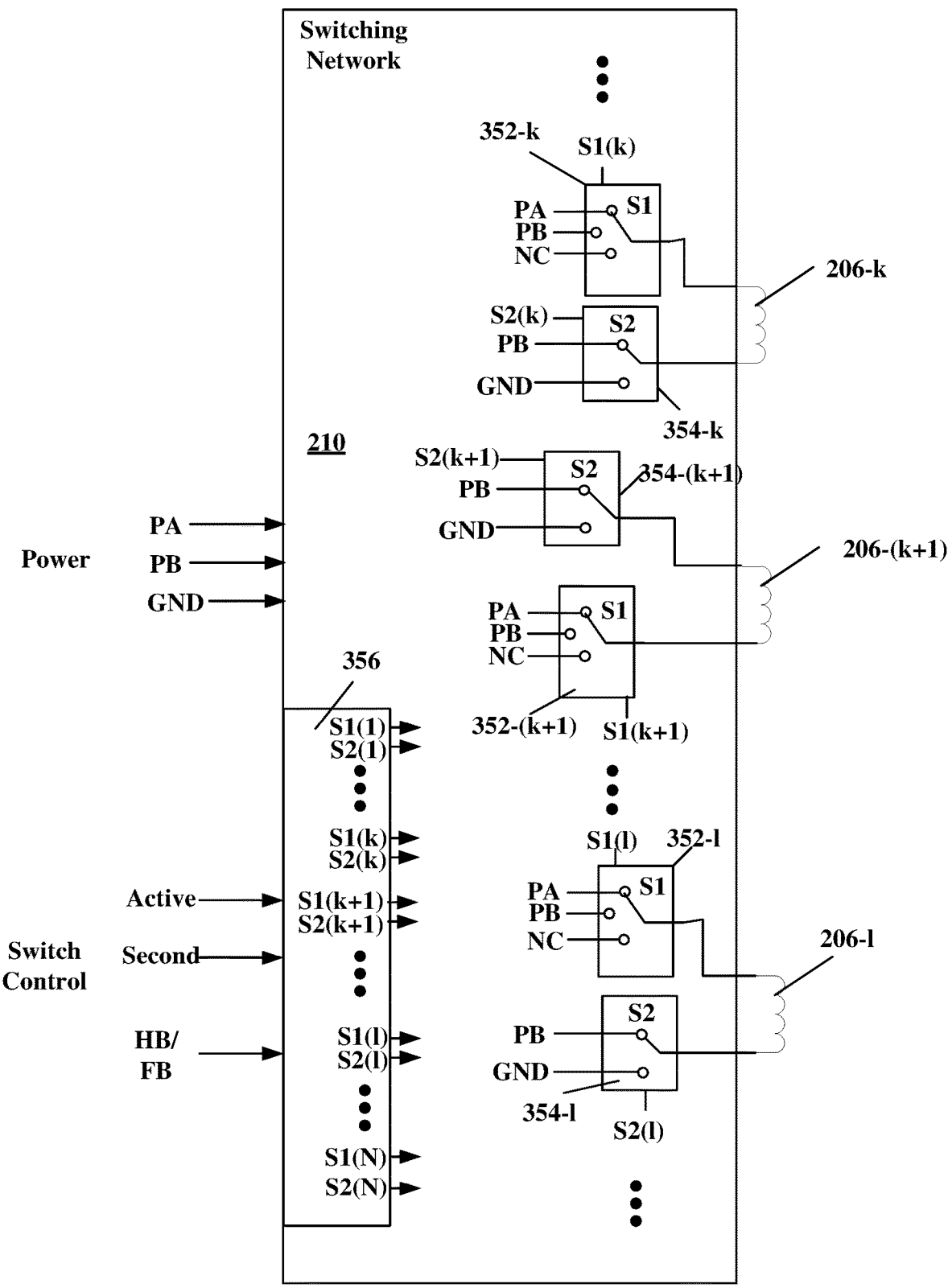

FIG. 3B illustrates an example of switching network 210. As illustrated in FIG. 3B, switching network receives power signals from power source 202 and switch control signals from controller 204. Based on the switch control signals, switching network 210 switches the power signals to one or more of the transmitter coils 206-1 through 206-N. In particular, the switching of arbitrary transmission coils 206-$k$ and 206-1 are illustrated as well as an example nearest-neighbor transmission coil to transmission coil 206-$k$, 206-($k$+1).

As is illustrated in FIG. 3B, switches 352-$k$ (switch S1) couples one of the voltages PA, PB, GND, or NC to a first side of transmission coil 206-$k$ while a switch 354-$k$ (switch S2) couples one of PB or GND to the second side of transmission coil 206-$k$. NC is no connection or, in some embodiments, a resistive connection to ground. Switch S1 352-$k$ coupled to transmission coil 206-$k$ is controlled by a signal S1($k$) while switch S2 354-$k$ coupled to transmission coil 206-$k$ is controlled by a signal S2($k$). Similarly, transmission coil 206-1 is coupled to a switch S1 352-1 driving by a signal S1(1) to couple one of voltages PA, PB, GND, or NC to a first side of transmission coil 206-1 and is coupled to a switch S2 354-1 driven by a signal S2(1) to couple one of voltages PB or GND to the second side of transmission coil 206-1. Transmission coils 206-$k$ and 206-1 are coiled the same way and consequently current is driven in the same direction through them.

As discussed above, nearest-neighbor transmission coils 206 are arranged to provide magnetic fields in opposite directions either by driving current through them in opposite directions or winding them in opposite directions. FIG. 3B illustrates an example where current is driven in opposite directions. Transmission coil 206-($k$+1) is a nearest-neighbor transmission coil to transmission coil 206-$k$. As is illustrated, switches S2 and S1 are switched so that a switch S2 354-($k$+1) is coupled to a first side of transmission coil 206-($k$+1) while a switch S1 352-($k$+1) is coupled to a second side of transmission coil 206-($k$+1) so that, when transmission coil 206-($k$+1) is activated, current is driven in an opposite direction from that of transmission coil 206-$k$. As is illustrated, switch S2 354-($k$+1) couples either PB or GND to the first side of transmission coil 206-($k$+1) in response to signal S2($k$+1) while switch S1 352-($k$+1) couples either PA, PB, GND, or NC to the second side of transmission coil 206-($k$+1) in response to signal S1($k$+1). If transmission coil 206-($k$+1) is wound opposite of transmission coil 206-$k$, then switches S1 and S2 coupled to transmission coil 206-($k$+1) would be oriented the same as shown with transmission coil 206-$k$.

The switch signals S1(1) through S1(N) and S2(1) through S2(N) are generated by controller 356 in response to the switch control signals. In some embodiments, controller 356 may be included in controller 204. Controller 356 can include a processor and memory sufficient to perform the functions described here.

As is illustrated in FIG. 3B, switch control signal includes an active signal, a secondary signal, and the half-bridge/full-bridge signal (HB/FB). The active signal identifies one or more active transmitter coils. The secondary signal includes one or more secondary transmitter coils to activate. The HB/FB signal indicates whether rectifier 202 is operating in half-bridge mode or in full-bridge mode. In some embodiments, the switches S1 and S2 for a random transmitter coil 206-$k$ (switch 352-$k$ and 354-$k$) that is operated as active or secondary is provided in the following table:

| Active | Secondary | HB/FB | S1(k) | S2(k) |
|--------|-----------|-------|-------|-------|
| Yes | No | FB | PA | PB |
| Yes | No | HB | PA | GND |
| No | Yes | FB | PA | PB |
| No | Yes | HB | PB | GND |
| No | No | FB | NC | GND |
| No | No | HB | NC | GND |

In some embodiments, more than one of transmitter coils 206-1 through 206-N can be identified as an active coil. Furthermore, more than on of transmitter coils 206-1 through 206-N can be identified as a secondary coil.

Figure 4:
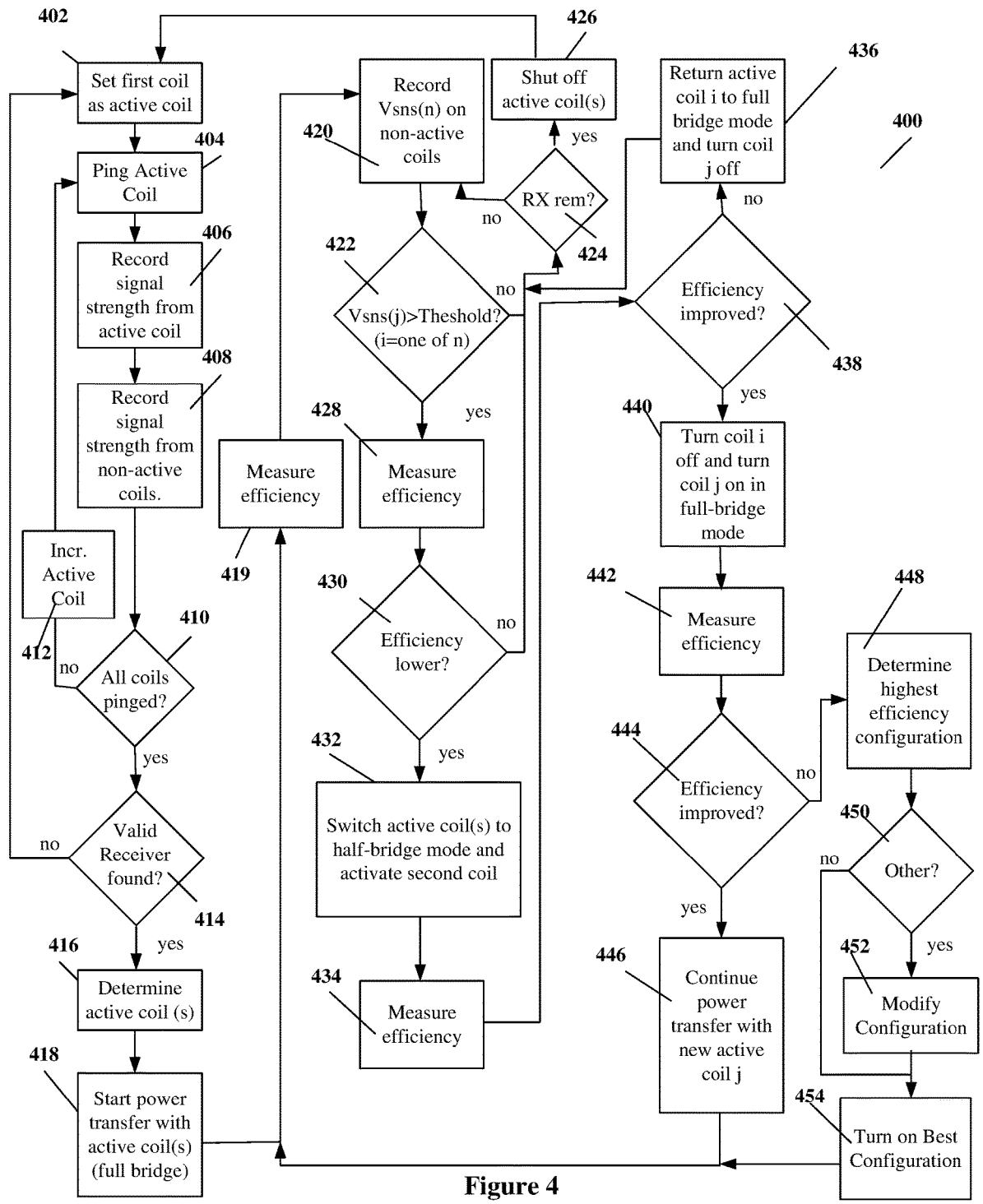
FIG. 4 illustrates operation of the multi-coil wireless transmitter as illustrated in FIGS. 2A and 2B.

FIG. 4 illustrates an algorithm 400 that can be executed on controller 204 to control multi-coil transmitter 200 according to some embodiments of the present invention. As illustrated in FIG. 4, algorithm 400 is initiated at step 402. In step 402, the first transmitter coil 206-1 can be set as the active coil. Algorithm 400 then proceeds to step 404 where the active coil is pinged to detect presence of a receiver coil 108. In step 406, the signal strength from the active coil is recorded and, in step 408, the signal strengths recorded from inactive coils are recorded. In step 410, algorithm 400 determines whether or not all of the transmitter coils 206-1 through 206-N have been surveyed as the active coil. If not, the active coil is incremented in step 412 and steps 404-408 are repeated.

If, in step 410, all of the transmit coils 206-1 through 206-N have been surveyed, then algorithm proceeds to step 414. In step 414, algorithm 400 determines whether a valid receiver is present. In some embodiments, a valid receiver can be identified because it responds to the ping. If no valid receiver is identified, then algorithm returns to step 402. In some embodiments, algorithm 400 may include a delay prior to restarting step 402.

If a valid receiver is identified in step 414, the algorithm 414 proceeds to step 416. In step 416, algorithm 400 determines one or more active coils. The identified active coil can be identified as the coil with the largest recorded signal strength. In some cases, there may be two adjacent ones of transmit coils 206 that have nearly identical signal strengths. In that case, both may be identified as active coils. In cases where the position of receiver coil 108 is in the vicinity of a dark area, then one more coils in the vicinity of the receiver coil 108 may be identified as active coils. In step 418, controller 204 provides switching signals to identify the active coils and activates power source 202 in full-bridge mode.

Once the active coils have been assigned and activated, then Algorithm 400 measures a base efficiency in step 419. As discussed above, the received power packet (RPP) can be received in the transmitter from the receiver. Since the transmitter knows the power transmitted, the efficiency can be calculated as the ratio of the received power from the RPP over the DC power in power source 202. Algorithm 400 then proceeds to step 420.

In step 420, the sensor signals Vsns(n) are recorded from each of the inactive coils 206-1 through 206-N. In step 422, if the sensor signal Vsns(j) from one of the inactive coils 206-1 through 206-N is greater than a threshold value, then algorithm proceeds to step 428. If not, then algorithm proceeds to step 424.

In step 424, algorithm 420 checks to see if the receiver has been removed. If not, then algorithm 400 proceeds to step 420 where the sensor signals are recorded again. If the receiver has been removed, then algorithm 400 proceeds to step 426 where all active coils are shut down. From step 426, algorithm 400 proceeds to step 402 where scanning for a new receiver is initiated.

If, in step 422, one or more of the sensor voltages for inactive coils is greater than the threshold voltage, then algorithm proceeds to step 428. In step 428, an efficiency measurement is performed to measure a first efficiency. As discussed above, the efficiency is once again calculated as the ratio of the received power from the RPP over the DC power in power source 202. In step 430, algorithm 400 determines if the efficiency is lower than the base efficiency measured in step 419. If not, then algorithm proceeds to step 424.

In step 430, if algorithm 400 determines that the efficiency is low, then algorithm 400 proceeds to step 432. In step 432, the active coil or coils is switched to half-bridge mode and a secondary coil is activated in half-bridge mode. The secondary coil is the coil identified in step 422 as being over the threshold. In some embodiments, more than one secondary coil can be identified. Algorithm 400 then proceeds to step 434.

In step 434, the efficiency is measured again to provide a second efficiency with the new coil configuration and algorithm 400 proceeds to step 438. In step 438, algorithm 400 determines whether or not the efficiency has improved with the new coil configuration by comparing the second efficiency with the first efficiency. If not, then algorithm 400 proceeds to step 436 where the original active coil is returned to full-bridge mode of operation of the secondary coil is turned off to become inactive and the base efficiency is reset to the first efficiency. From step 436, algorithm 400 proceeds to step 424.

If in step 438, algorithm 400 determines that the efficiency has improved, then algorithm 400 proceeds to step 440. In step 440, the active coil 206-i is turned off and the secondary coil j is turned on in full bridge mode. Algorithm 400 then proceeds to step 442 where the efficiency is measured again to provide a third efficiency.

In step 444, algorithm determines whether or not the efficiency has improved by comparing the third efficiency with the second efficiency. If yes, then algorithm proceeds to step 446 where power transfer continues with the new active coil or coils operating. Algorithm 446 then returns to step 420 to continue monitoring the power transfer.

If, in step 444, it is determined that efficiency has not improved, then algorithm 400 proceeds to step 448 where algorithm determines which of the test efficiencies is the highest. This includes the configuration tested in step 428, 434, and 442. Algorithm 448 then proceeds to step 450 where algorithm 400 determines whether or not communication can be improved aside from efficiency optimization. If so, then algorithm 400 proceeds to step 452 where the configuration determined in step 448 is either replaced or modified according to the improvements and the algorithm can then proceed to step 454. If, in step 450, it is determined that the configuration cannot be improved, the algorithm proceeds directly to step 454, bypassing step 452.

In step 454, algorithm 400 turns on the best configuration as determined in step 458 or as modified or replaced in step 452. Algorithm 400 then returns to step 419 to reset the base efficiency and continue monitoring the power transfer in step 420.

Consequently, embodiments of the present invention can smoothly transfer between coil configurations to keep a high efficiency wireless power transfer. Configurations can include activation of one or more coils operating in full-bridge or half-bridge modes of operation.

Embodiments of the invention described herein are not intended to be limiting of the invention. One skilled in the art will recognize that numerous variations and modifications within the scope of the present invention are possible. Consequently, the present invention is set forth in the following claims.

What is claimed is:

1. A wireless power transmitter, comprising:
   a plurality of coils, the plurality of coils configured such that nearest-neighbor coils produce magnetic fields of opposite directions;
   a switching network coupled to the plurality of coils, the switching network receiving one or more power signals and applying the one or more power signals to one or more of the plurality of coils according to switching signals;
   a power source configured to provide the one or more power signals to the switching network according to power control signals, the power source configured to supply each coil of the plurality of coils according to a full-bridge mode or a half-bridge mode;
   a signal sensor configured to receive signals from each of the plurality of coils and provide sense signals; and
   a controller configured to provide switching signals to the switching network, power control signals to the power source, and to receive sense signals from the signal sensors, the controller configured to execute instructions to
      determine a position of a receiver relative to the plurality of coils based on the sense signals;
      select one or more of the plurality of coils as active coils based on the position;
      determine for each of the active coils operation in the full-bridge mode or the half-bridge mode, based on the position, the active coils, and efficiency;
      provide power control signals to the power source according to the determined operation in the full-bridge mode or the half-bridge mode;
      provide switching signals to the switching network to provide power from the one or more power signals to the active coils;
      monitor the sense signals to determine whether the receiver has moved to a new position; and
      if the receiver has moved to a new position,
         reassign active coils according to the new position, and
         transition power in the switching network to provide power from the reassigned active coils.

2. The wireless power transmitter according to claim 1, wherein the power source includes a rectifier that operates in the full-bridge mode or the half-bridge mode according to a mode signal in the power control signals.

3. The wireless power transmitter according to claim 2, wherein the rectifier includes:

a first transistor having a first gate;
a second transistor having a second gate, the first transistor and the second transistor being coupled in series between a rectifier voltage and a ground;
a third transistor having a third gate;
a fourth transistor having a fourth gate, the third transistor and the fourth transistor being coupled in series between the rectifier voltage and the ground in parallel with the first transistor and a second transistor;
a first node between the first transistor and the second transistor providing a first node voltage;
a second node between the third transistor and the fourth transistor providing a second node voltage,
wherein the first gate, the second gate, the third gate, and the fourth gate are driven to provide the first node voltage and the second node voltage.

4. The wireless power transmitter according to claim 3, wherein in full-bridge mode the first gate and the fourth gate are alternately driven with the second gate and the third gate to provide an alternating voltage between the first node voltage and the second node voltage.

5. The wireless power transmitter according to claim 3, wherein in half-bridge mode the first gate is driven alternately with the second gate to provide an alternating voltage between the first node voltage and ground.

6. The wireless power transmitter according to claim 5, wherein the third gate is driven alternately with the fourth gate to provide an alternating voltage between the second node voltage and ground.

7. The wireless power transmitter according to claim 3, further including a power controller that provides driving signals to the first gate, the second gate, the third gate, and the fourth gate.

8. The wireless power transmitter according to claim 7, wherein the power controller receives signals from the controller indicating power levels, mode of operation, and center frequencies.

9. The wireless power transmitter according to claim 8, wherein the power controller further receives frequency signals from a device communications, the device communications receiving amplitude modulates signals and transmitting frequency modulation signals.

10. The wireless power transmitter according to claim 3, wherein the switching network receives switch control signals from the controller and power signals, the switch control signals identifying active and second coils and half-bridge mode or full-bridge mode of operation, and the power signals include the first node voltage, the second node voltage, and the ground.

11. A method of transmitting power, comprising:
sequentially pinging each of a plurality of transmit coils to locate a receiver;
determining one or more active coils from the plurality of transmit coils based on the location of the receiver;
determining for each of the one or more active coils whether operation is in a full-bridge mode or a half-bridge mode based on location of the receiver, the active coils, and efficiency;
activating the one or more active coils in the full-bridge mode or the half-bridge mode to transfer power to the receiver;
determining a base efficiency based on the one or more active coils;
monitoring non-active ones of the plurality of transmit coils;
determining if the receiver has moved based on the monitoring;
if the receiver has moved to a new position,
determining secondary coils according to the new position, and
transitioning power to provide power from a new active coil configuration,
wherein the plurality of transmit coils are configured such that nearest-neighbor coils produce magnetic fields of opposite direction.

12. The method of claim 11, wherein sequentially pinging each of a plurality of transmit coils to locate a receiver comprises:
setting a first coil as an active coil;
pinging the active coil;
recording a signal strength from the active coil;
recording signal strengths from each of the inactive coils; and
increment the active coil.

13. The method of claim 12, wherein determining the location of the receiver includes identifying the one of the plurality of transmit coils having stronger signal strengths.

14. The method of claim 11, wherein monitoring non-active ones of the plurality of transmit coils includes recording sense signals from each of the non-active ones of the plurality of transmit coils.

15. The method of claim 14, wherein determining whether the receiver has moved includes:
determining that a sense signal has increased above a threshold value;
measuring a first efficiency; and
determining that the efficiency is lowered from the base efficiency,
wherein the receiver is determined to have moved if both one of the sensor voltages have increased above the threshold and the efficiency is lowered.

16. The method of claim 15, wherein determining secondary coils according to the new position includes identifying the secondary coils from the sense signals from non-active coils.

17. The method of claim 16, wherein transitioning to provide power from a new active coil configuration comprises:
switching the active coils to half-bridge mode;
activating the secondary coils;
measuring a second efficiency;
comparing the second efficiency with the first efficiency to determine whether efficiency has improved;
if efficiency has not improved, returning the active coils to full bridge mode, turning the reassigned active coils off, and assigning the active coils to be the new active coil configuration;
if efficiency has improved,
turning the active coils off and turning the secondary coils to full bridge mode,
measuring a third efficiency,
comparing the third efficiency with the second efficiency to determine if the efficiency has improved,
if efficiency has improved, assigning the secondary active coils to the active coils to form the new active coil configuration, and
if efficiency has not improved, defining the new active configuration to be the combination of active coils and secondary coils that result in a highest efficiency configuration of the active coils and the second coils and activating the highest efficiency configuration.

18. The method of claim 17, further including determining whether a better configuration can be provided other than that by efficiency optimization.

19. The wireless power transmitter according to claim 1, wherein the plurality of coils is configured such that nearest-neighbor coils produce magnetic fields of opposite directions by providing coils wound in opposite directions.

20. The wireless power transmitter according to claim 1, wherein the plurality of coils is configured such that nearest-neighbor coils produce magnetic fields of opposite directions by driving current through the coils in opposite directions.

* * * * *